July 10, 1962   H. T. WENTWORTH   3,043,366
VALVE ASSEMBLY SELECTIVELY OPERABLE INCLUDING
POWER DRIVE AND REMOTE CONTROL
Filed June 16, 1958   5 Sheets-Sheet 1
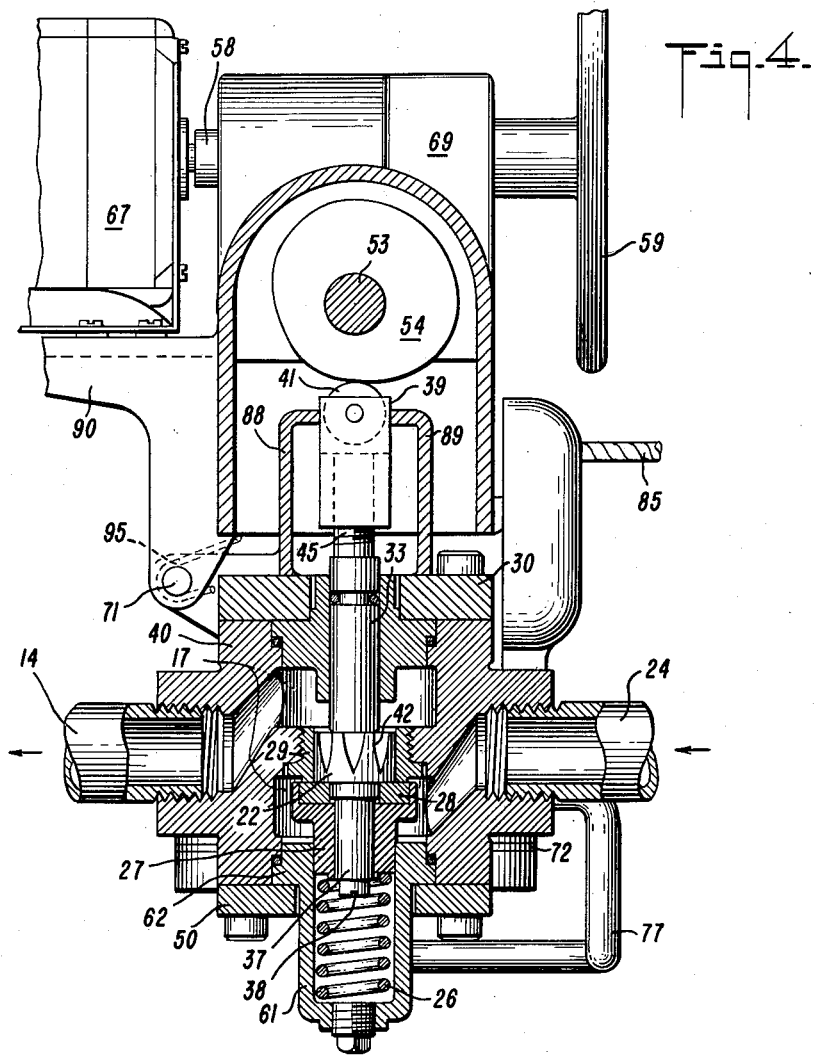
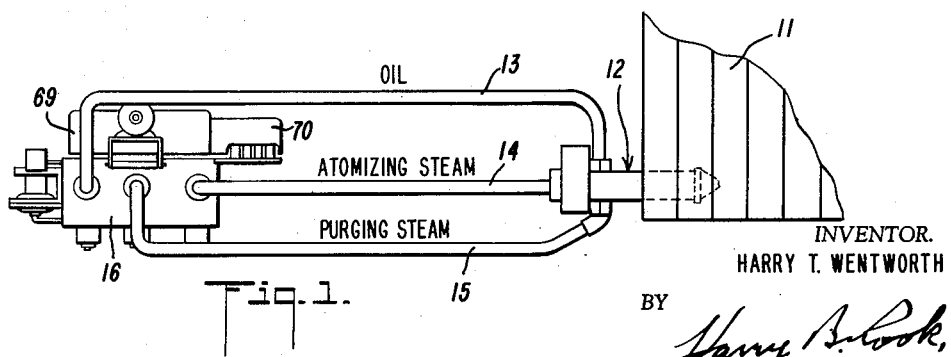
INVENTOR.
HARRY T. WENTWORTH
BY
*Harry B. Cook,*
ATTORNEY

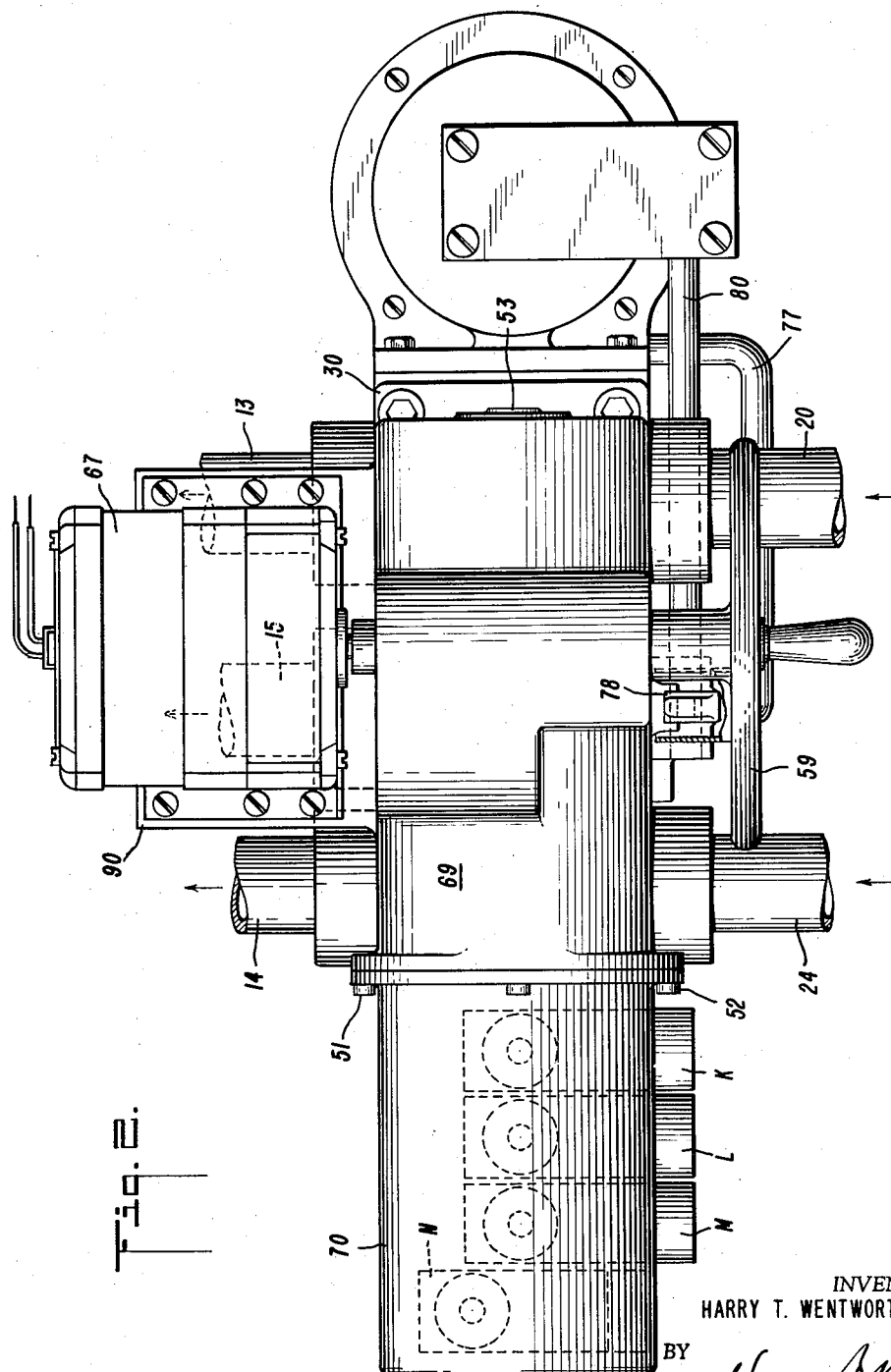

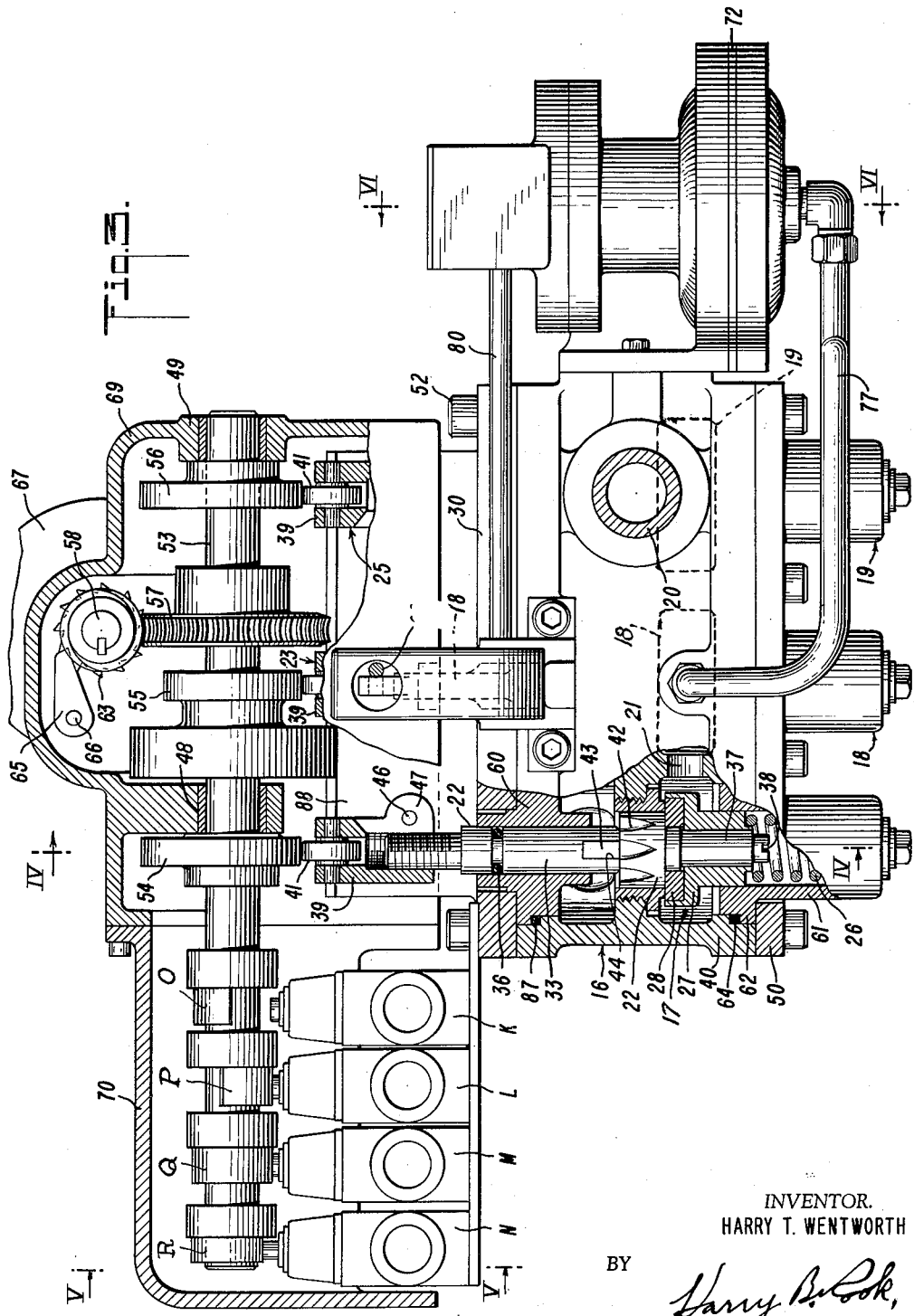

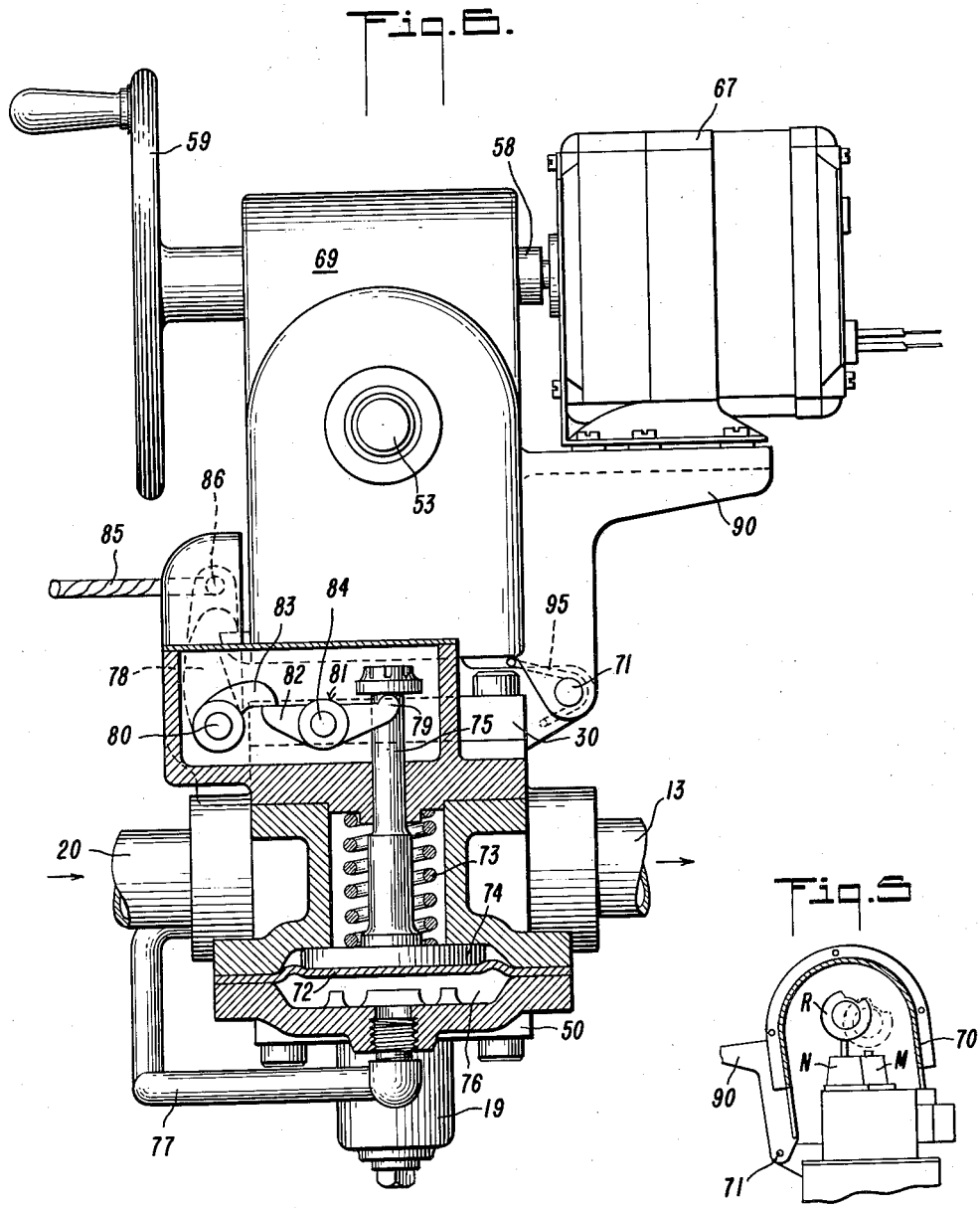

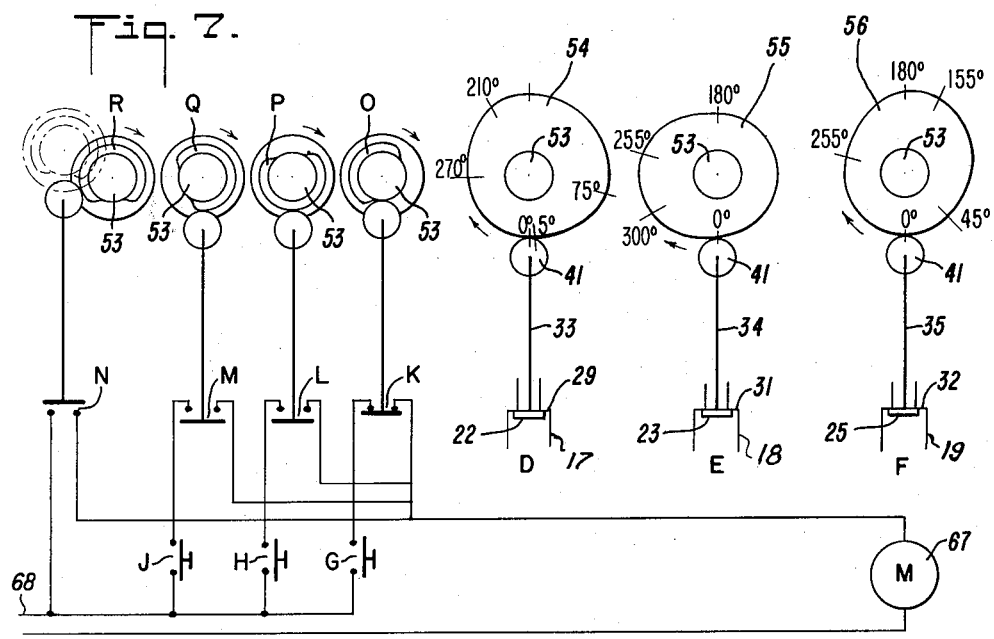
Fig. 7.
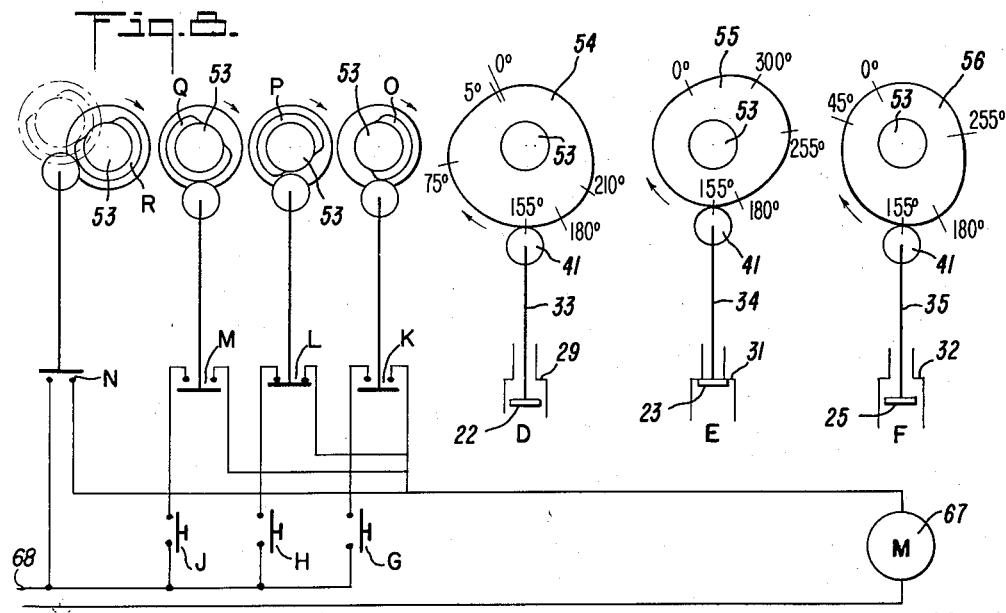
Fig. 8.
| | |
|---|---|
| D,E,F, CLOSED | 0° |
| D STARTS TO OPEN | 5° |
| F STARTS TO OPEN | 45° |
| D WIDE OPEN | 75° |
| F WIDE OPEN | 155° |
| F STARTS TO CLOSE | 180° |
| E STARTS TO OPEN | 180° |
| D STARTS TO CLOSE | 210° |
| F CLOSED, E OPEN | 255° |
| D CLOSED | 270° |
| E CLOSED | 360° |
Fig. 9.
INVENTOR.
HARRY T. WENTWORTH
BY
Harry B. Cook,
ATTORNEY

United States Patent Office 3,043,366
Patented July 10, 1962

3,043,366
VALVE ASSEMBLY SELECTIVELY OPERABLE INCLUDING POWER DRIVE AND REMOTE CONTROL
Harry T. Wentworth, 343 Tichenor Ave., South Orange, N.J.
Filed June 16, 1958, Ser. No. 742,394
5 Claims. (Cl. 158—36)

This application is a continuation-in-part of my application Serial No. 665,984, filed June 17, 1957, now abandoned.

This invention relates to a multiple valve assembly and mechanism used therewith for operating the valves thereof in a predetermined sequence.

In the operation of oil burners, for example, oil is normally fed toward a combustion chamber, with which a particular oil burner is associated, along with atomizing steam, the oil and steam being controlled by separate valves. Periodically the atomizing steam and the oil, which is operated on by said steam, are shut off and a jet of steam by itself is directed into the combustion chamber to clean or purge it. There has thus always been a danger in operating such valves at the wrong times with, as a consequence, explosions or other troubles.

The present invention is directed towards overcoming such difficulties, as an improvement over that of the parent application above identified. It involves the assembly of three valves, preferably in a single casing, for the atomizing steam, the purging steam, and the oil, respectively. Each chamber houses a reciprocating valve resiliently biased toward an enclosed seat. Each valve has a stem, desirably carrying a roller engageable by a cam mounted on a cam shaft. The cam shaft desirably carries a wheel which is operated by a worm on another shaft, said other shaft carrying a ratchet engaged by a pawl to allow turning in only one direction, and a hand wheel for turning the shaft to open and close the valves in a predetermined sequence, which sequence repeats after going through one cycle. The cams are, of course, shaped to provide for this desired sequence for opening and closing their respective valves.

The improvement in the present application over that of the parent application involves the employment of power means for turning the cam shaft, together with suitable cam-operated microswitches, push button switches, circuits and safety means for insuring that the power means will not operate after the steam pressure fails or if such is absent, also including remote-control means for rendering the apparatus inoperative as desired.

When it is desired to purge, the machine is operated until the oil is shut off and the purging valve opened to admit purging steam to clean the oil burner associated with the fire box. By virtue of the shape and positioning of the cams on their shaft, it is impossible to operate the valves in the wrong sequence, the whole operation being controlled by the drive motor or other power means and, in the alternative, by a single hand wheel.

It is, therefore, a broad object of this invention to provide a system including a plurality of valves, and means to open and close them in a predetermined sequence.

Another object of my invention is to provide a valve casing divided into a plurality of compartments, separate valves reciprocable in said casing, one in each compartment, with their axes parallel and lying in the same plane, each with a stem and spring-biased to closed position for controlling the flow of fluid from said compartments, and cams which are operated to push against said stems for individually opening and allowing spring-closing of said valves in only a predetermined sequence.

A further object of my invention is to provide a machine of the character described in which the cam shaft assembly is hinged with respect to the main casing, so that it may be immediately released and partly opened to thereby render the cam mechanism inoperative and allow all of the valves to close.

A still further object of my invention is to provide mechanism of a character described in the parent application, before identified, in which power means has been added to provide for the remote control thereof.

Another object of my invention is to provide mechanism of a character contemplated which cannot be operated if the pressure of the atomizing steam fails or is absent and in which, if such pressure fails, the valves are automatically closed by movement of the cams out of operative relation to the valve stems and the motor will turn the cam shaft to the starting position.

An additional object of my invention is to provide mechanism of the character described which may in an emergency be stopped by hand.

A further object of my invention is the provision of an improved valve.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings wherein like reference characters denote like parts in the several views:

FIGURE 1 is a diagrammatic assembly view of my valve casing connected with an oil burner, which is in turn associated with a firebox or combustion chamber.

FIGURE 2 is a plan of a machine embodying my invention and which may be used in the assembly of FIGURE 1.

FIGURE 3 is a vertical sectional view of the machine on the plane of the line III—III of FIGURE 2, in the direction of the arrows, with parts in elevation.

FIGURE 4 is a transverse sectional view on the plane of the line IV—IV of FIGURE 3, in the direction of the arrows, with parts in elevation.

FIGURE 5 is a fragmentary transverse sectional view on the plane of the line V—V of FIGURE 3, in the direction of the arrows, with parts in elevation, showing the position of the parts after the cam housing has been unlatched.

FIGURE 6 is a transverse sectional view on the plane of the line VI—VI of FIGURE 3, in the direction of the arrows, parts being shown in elevation.

FIGURE 7 is a diagrammatic view of the valves, cams, switches and wiring, in the starting position or with all valves closed.

FIGURE 8 is a view corresponding to FIGURE 7 but showing a subsequent position after the cam shaft has turned 155° to the "wide open" operating position, or the one in which both the atomizing steam and oil valves are open and the purging steam valve closed.

FIGURE 9 is a chart showing the positions of the valves at different phases of the cycle, that is, at the various angular positions of the cam shaft and the cams carried thereby.

Referring to the drawings in detail, and first considering the assembly illustrated in FIGURE 1, there is shown a fire-box or combustion chamber 11, with which is associated and into which is directed an oil burner 12. The oil burner has three supply pipes, 13 for oil, 14 for steam to atomize the oil and 15 for steam to clean or purge the burner 11. These supply pipes lead out of a casing 16 which has a plurality of chambers, that designated 17 being for the oil-atomizing steam, 18 being for the purging steam, and 19 being for the oil. The chambers 17 and 18 are connected by a port 21, and both of these connected chambers receive steam from a single connecting pipe 24 and discharge steam through the pipes 14 and 15 on the other side of the valves 22 and 23.

Inasmuch as all of the chambers and their valves and parts associated therewith are identical, only one is shown in detail in FIGURE 3, but the other valves and their parts are shown diagrammatically in FIGURES 7 and 8. The oil chamber 19 is desirably separated from the purging steam chamber 18 by an air space. It receives oil through a single supply pipe 20 and discharges it, after passing through its valve 25, to the oil pipe 13. The casing 16 may consist of an upper cover 30, an intermediate, body, or valve-seat holding part 40, and a lower cover or valve-biasing spring holding part 50, bolted together or otherwise suitably connected.

The valves 22, 23 and 25 are biased by springs 26, only one of which is illustrated, into closing engagement with their respective seats 29, 31 and 32. Each spring 26 is carried in a cup 61 having an outstanding flange 62 adjacent its upper end supported on the spring holding part 50 of the casing 16 with packing 64 between it and the valve seat holding part 40. The valves have stems 33, 34 and 35 reciprocable within the casing 16 in guide blocks 60, packing 36 and 87 being employed in each instance to make fluid-tight the passage of each valve stem in its guide block and the guide blocks tight in the casing. The upper end portion of each of the valve stems 33, 34 and 35 desirably carries a head 39 in which is pivoted a roller 41. Undesired turning of the heads 39 is prevented by having them mounted between the inturned top portions of webs 88 and 89 upstanding from the top of the cover 30.

Each valve 22, 23 and 25, may consist of a lower portion 27, directly engaged by its biasing spring 26, and carrying packing 28 to insure adequate sealing against its valve seat 29. A valve head 37 for each valve has a depending stem portion mounted inside the lower valve portion 27 and provided with a downwardly opening notch 38 to receive a screw driver or other tool for turning it to effect a desired adjustment. Each valve head 37 is fluted or formed with upwardly expanding grooves 42 to insure that the fluid is released gradually as its valve is opened.

Each head 37 terminates in an upwardly extending flange 43 received in a corresponding notch 44 in the lower end of its valve stem 33, 34, or 35, as the case may be, thereby allowing for some lateral adjusting movement between each head or disc 37 and its stem thereabove, and providing a corresponding alignment tolerance. As the upper end of each valve stem is threadably received in its roller head 39, as indicated by the upper threaded portion 45, adjustment may be effected by applying a screw driver in the notch 38 and turning until the complete valve assembly is shortened or lengthened to the desired extent. After such adjustment, clamping in the desired position may be effected by tightening a bolt or bolt and nut arrangement extending through bifurcations 47 in one side of each roller head 39.

Carried above the valve casing 16 are bearings 48 and 49 in a housing 69 which may have connected thereto, as by means of bolts 51 and 52, a cover 70 for other cams. Journalled in these bearings 48 and 49 is a shaft 53 on which is fixed, as by means of set screws or the like not shown, cams 54, 55 and 56. Said cams respectively serve to operate the valves 22, 23 and 25 by engagement with upper ends of their stems 33, 34 and 35, or corresponding rollers 41 thereon.

One means for operating the shaft 53 in the present instance comprises a toothed wheel 57 connected to the shaft by suitable means, such as a set screw or pin, and operated by meshing with a worm carried by a cross shaft 58, to which it is fixed by suitable means. The shaft 58 is manually turnable by means of a hand wheel 59 secured thereto by suitable means, such as a set screw and/or nut, not shown.

In order to insure that the cams operate the valves in only a definite predetermined sequence, provision is made to insure that the shaft 53 can turn in one direction only. Such provision in the present embodiment comprises a ratchet 63 fixed on said shaft by suitable means and engaged by a pawl 65 pivoted with respect to the casing, as indicated at 66, and biased into engagement with said ratchet by suitable means, such as gravity or a spring, not shown.

In the present embodiment, I provide for power as well as manual operation of the shaft 58, as by connecting thereto an electric motor 67. The motor may be supported on a bracket 90 extending from the housing 69 and is controlled by microswitches K, L and M and push button switches G, H and J. The microswitches K, L and M are respectively operated by cams O, P and Q, fixed on the same shaft 53 that carries the cams 54, 55 and 56 or an axial extension thereof. When the cams 54, 55 and 56 are in the position shown in FIGURE 7, all of the valves 22, 23 and 25 are closed and the system is shut down. Closing push button switches H or J will produce no action, as their microswitches L and M are open. Therefore, the only action which can be taken, and which action is desired, is the holding down of starting push button switch G, because the microswitch K is closed, and the starting of the motor 67.

The motor 67 will then rotate until the cam O acts to open the microswitch K. This will stop the motor at that point, after the cam shaft has turned through 155° to the position illustrated in FIGURE 8, by breaking the circuit thereto from power source 68, where the cams 54 and 56 have produced the maximum opening of their valves 22 and 25, respectively. By the contours of the cams 54 to 56, this has been accomplished so that the atomizing steam valve 22 always opens ahead of the oil 25, thus insuring that oil will never enter the burner or firebox before atomizing steam is present.

The cam P is so set that when the cam O opens its switch K, thus stopping the motor 67, the switch L will close. Thus purging is the only possible selection of operation available after a period of burner operation. Closing the purging switch H then will again start the motor 67 which will continue to rotate the cam shaft 53 until the cam P automatically opens the microswitch L, which again stops the motor. During this operation of the motor the cam 56 has rotated to such an extent that the oil valve 25 is closed, while the cams 54 and 55 have rotated to close the atomizing steam valve 22 while opening the purging steam valve 23. It will be noted that the oil valve 25 closes first, followed by a closing of the atomizing steam valve 22 and an opening of the purging steam valve 23.

At the moment the cam P opens its microswitch L, thus stopping the motor 67 in the purging position, the cam Q has allowed its switch M end to close so that the only possible selection of operation is to close the shut-down push button switch J. Closing of the switch J will again start the motor, which will rotate the cam shaft 53 to that position where the cams 54, 55 and 56 will have closed all of their valves 22, 23 and 25 and the operation is again stopped by the action of the cam Q in opening its microswitch M. At the moment the switch M opens, cam O allows its switch K to close and the cycle has been completed. The only possible selection of operation at this point is a starting up operation, by closing the push-button switch G. A timing control may, if desired, be used in place of or in conjunction with the switches H and J to control the duration of the purging operation.

*Automatic Shut-Down on Steam Failure*

In addition to the cams previously described, there is a cam R on the same shaft 53 and which operates with the other cams. This cam has a normally open microswitch N which comes into operation, or is closed, only upon failure or non-existence of atomizing steam pressure, and which is laterally offset with respect thereto and with respect to the other microswitches, as viewed in FIGURES 2, 3, 5, 7 and 8. Connections for the switch N are made directly from the power line, with no push button control, so that its action is entirely automatic. Its sole purpose is to place the cam shaft 53 in starting position upon failure of atomizing steam pressure, regardless of its position at the time of failure. Referring to FIGURES 3, 5 and 6, it will be seen that the housing 69 carrying the cam shaft 53, including the cover 70 for the cams O, P, Q and R, secured thereto, is pivoted, as indicated at 71, so that it can swing and lift the shaft and its cams a sufficient distance such that all cams except R become ineffective, insofar as operating any of the valves 22, 23 and 25 is concerned.

As seen in FIGURES 3 and 6, there is a diaphragm 72 biased, as by a spring 73 acting on the head 74 of a plunger 75, to oppose the action of steam pressure in the diaphragm chamber 76. Chamber 76 communicates with the chambers of the steam valves 22 and 23 by a tube 77, so that if steam pressure does not exist, or fails during operation, the spring 73 will trip the latch 78 fixed on pivoted shaft 80, by pulling down on the arm 79 of lever 81, pivoted at 84. The other arm 82 of lever 81 then acts on a crank arm 83 fixed on shaft 80 and turns latch 78 and its shaft 80 counter-clockwise as viewed in FIGURE 6. The housing 69 and cover 70, due to the action of the release spring 95, will then swing back, or clockwise as viewed in FIGURE 6, out of action, or to the position illustrated in FIGURE 5, and all of the valves 22, 23 and 25 will be released to instantly close.

In swinging back, the cam R will contact and close its microswitch N, thereby closing a power circuit to the motor 67 and causing it to rotate the cam shaft 53 until the cam R opens the switch N, thereby stopping the motor when all of the cams are in starting position.

In all cases the housing 69 and cover 70 must be reset by hand and cannot be reset unless atomizing steam pressure is available at the inlet to the valves 22 and 23. When this condition is satisfied, the housing and cover may be re-latched and then, due to the previous action of cam R, the cam shaft is necessarily in the starting position. This feature makes it impossible to open any of the valves, 22, 23 and 24, when the relatching is effected by hand. A pull cord or link 85, or a solenoid, may be connected at 86 for tripping or closing the valves 22, 23 and 24 manually at any time.

Sequence of Operations

From a consideration of FIGURE 9, it will be seen that the sequence provided by the desired embodiment of my invention is that at the shut-down or 0° positions of the valves, which is illustrated in FIGURE 7, the corresponding position of the cam 54 being illustrated in FIGURE 4, the oil burner is in neutral condition ready for starting the operation at the beginning of a cycle, that is, all of the valves 22, 23 and 25 are closed. Upon pushing the starting switch G, a circuit is closed through the closed microswitch K to start the motor 67 and turn the cam shaft 53. After turning clockwise 5° from such 0° position, as viewed in FIGURES 4, 7 and 8, the atomizing steam valve 22 starts to open. Upon another 40° turn, that is to the 45° position, the oil valve 25 starts to open. After turning another 30°, that is, to the 75° position, the plateau of the high or operating dwell of the cam 54 reaches the oil atomizing steam valve stem roller and the atomizing steam valve 22 is wide open. It is not until a turn to the 155° position is made that the plateau of the operating dwell of the cam 56 reaches the roller of the oil valve 25 to move it to its wide open position, as shown most clearly in FIGURE 8.

This is the position for normal operation of the oil burner, that is, with the atomizing steam and the oil valves fully open and the purging steam valve closed. It will, of course, be understood that in this position the motor automatically stops, as the microswitch K has been opened by operation of its cam O, and the operation of the oil burner may be continued as long as desired without any further action on the part of the attendant.

If it is desired to effect a purging operation, the purging switch H is pushed, a circuit is closed through the then closed microswitch L, and the motor 67 again operates to continue turning the shaft 53. At the 180° position, the end of the plateau of the operating dwell of the cam 56 is reached and the oil valve 25 starts to close and the purging steam valve 23 starts to open, at the beginning of the operating dwell of the cam 55. Upon reaching the 210° position, the atomizing steam valve 22 starts to close at the end of the plateau of the operating dwell of the cam 54. On reaching the 255° position, the oil valve 25 is completely closed and, as the plateau of the operating dwell of the cam 55 has been reached, the purging steam valve 23 is wide open for a purging operation. At this point the motor is again stopped by the opening of the microswitch L by the cam P and purging continues as long as desired.

When it is desired to stop the purging operation and reset the valves for the starting of a new cycle, the push button switch J is depressed which again starts the motor by closing a circuit through the microswitch M which is then closed. The motor 67 again operates until the shaft 53 reaches the 270° position when the atomizing steam valve 22 is fully closed. At the 300° position the purging steam valve 23 starts to close. At the 360° position the purging steam valve 23 is fully closed, ending the cycle, and the switch M is opened by its cam Q, stopping the motor 67. At the same time the cam O closes the switch K, conditioning the machine for a repetition of the cycle.

If at any time during the cycle, it is desired to stop the operation and return the valves to 0° or initial position, the latch 78 may be tripped, as by pulling the cord 85, to thereby effect a release of the housing 69 and its attached cover 70 to the position of FIGURE 5, where the microswitch N is closed to establish a circuit to the motor and cause it to operate the shaft 53 until the starting position is reached. Also, if the steam pressure fails at any time or is absent, this latch is tripped, in a manner previously described, to effect the same result.

From the foregoing disclosure it will be seen that I have devised a valve casing, valves reciprocable therein, and operating mechanism therefor, whereby an oil burner may be operated by feeding oil and atomizing steam thereto, with at times cutting off the oil and adding purging steam to clean the burner and clear of gases an associated firebox or combustion chamber, all without the necessity for any thought on the part of the operator other than to push a button or turn a hand wheel in the one and only direction which is possible.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In combination, a valve casing having an upper portion and lower portion the latter of which is divided into two intercommunicating steam compartments having a common inlet for connection to a steam supply and separate outlets for connection to an oil burner, said casing also having an oil compartment provided with an inlet for oil and an outlet, an oil-atomizing oil burner, an oil-atomizing steam connection between one of said steam compartments and said oil burner, a purging steam connection between the other of said steam compartments and the oil burner, and an oil connection between said oil compartment and said burner, an oil-atomizing steam valve means, a purging steam valve means and an oil supply valve means, each of said means including a valve reciprocable in said casing in the respective compartment, with the axes of all of said valves parallel and lying in the same plane, each valve having a stem and being spring biased to closed position, for controlling the flow of fluid through said compartments to said oil burner, a roller carried by each stem, a shaft journalled in and carried by the upper portion of said casing and disposed perpendicular to and in the plane of said valve axes, a plurality of cams fixed on said shaft, one cam being in engagement with each roller for opening and closing said valves, an electric motor geared to said shaft, a source of power for said motor, a plurality of circuits between said source and said motor, each circuit including a switch in series with a push button switch and each circuit, including the switch combinations, being in parallel with one another and in series with the motor, and a series of cams on said cam shaft for controlling opening and closing of said switches as the shaft turns.

2. The combination as defined in claim 1, wherein the upper part of the valve casing functions as a housing carrying the cam shaft and pivoted with respect to the portion therebeneath, a spring biases said upper portion to open position, and with the addition of a latch comprising coacting parts mounted on the upper and lower sections of the casing respectively for normally holding said upper portion closed with respect to the lower portion, and means responsive to the steam pressure are provided for releasing said latch to allow said upper portion of the casing to rise to render the cams on said shaft inoperative upon failure of steam pressure, comprising a steam chamber, a diaphragm, closing the top of said chamber, a plunger reciprocable in said casing with a head spring biased downwardly into engagement with the upper surface of said diaphragm, a steam pressure connection to said diaphragm chamber to oppose the spring so that only if said pressure is absent the plunger will be moved downward by its spring, and a lever pivotally mounted on the lower portion of said casing, one arm of said lever being connected to said plunger so as to be pulled down by the spring acting on said plunger and the other arm of said lever upon such movement coacting with said latch to trip the latch and release the pivoted upper portion of the housing.

3. The combination as defined in claim 1 wherein the upper portion of the valve casing functions as a housing carrying the cam shaft and pivoted with respect to the portion therebeneath, a spring biases said upper portion to open position, a latch comprising coacting parts mounted on the lower portion and upper portion of the casing respectively for normally holding said upper portion closed with respect to the lower portion, and with the addition of means responsive to the steam pressure and coacting with said latch for releasing said latch upon absence of steam pressure to allow said upper portion to rise to render the cams on said shaft incapable of actuating their respective valve stems.

4. The combination as defined in claim 2 with the addition of a normally open microswitch on the lower portion of said casing connected directly in circuit with said source of power and said motor, and a cam on said shaft to close said switch upon release of the upper portion of the casing into open position and to permit opening of said switch after the shaft has been rotated by the motor to locate all of the other cams on said shaft in starting position with respect to their corresponding valves.

5. In combination with an oil-atomizing oil burner, a valve casing having a portion divided into two intercommunicating steam compartments having a common inlet for connection to a steam supply and separate outlets for connection to the oil burner, said casing also having an oil compartment provided with an inlet for oil and an outlet, an oil-atomizing steam connection between one of said steam compartments and the oil inlet of said oil burner, a purging steam connection between the other of said steam compartments and the oil burner, and an oil connection between said oil compartment and the oil inlet of the burner, an oil-atomizing steam valve means, a purging steam valve means and an oil supply valve means, each of said means including a valve reciprocable in said casing and coactive with a valve seat in the respective compartment, with the axes of all of said valves parallel and lying in the same plane, each valve having a stem and being spring biased to closed position, for controlling the flow of fluid through said compartments to said oil burner, a roller carried by each stem, a shaft journalled in and carried by said casing and disposed perpendicular to and in the plane of said valve axes, a plurality of cams fixed on said shaft, one cam being in engagement with each roller for opening and closing said valves, a worm wheel fixed on said shaft, a worm meshing with said worm wheel, a shaft journalled in the casing fixedly carrying said worm, a ratchet fixed on said worm-carrying shaft, a pawl pivoted to said casing and engaging said ratchet to allow turning movement thereof in only one direction, and an operating hand wheel fixed on said worm-carrying shaft, each of said valves having a lower portion, each valve also having a generally cylindrical head with a depending stem portion mounted inside of said lower portion and provided with a downwardly opening notch to receive an adjusting tool, said head being formed with upwardly expanding grooves on its peripheral surface and terminating in an upwardly extending flange, the valve stem having a downwardly opening notch receiving said flange to thereby provide for the transmission of rotary motion with lateral tolerance, said valve stem being reciprocable in a guide block and terminating in a threaded portion, a head carrying the corresponding roller and threaded for adjustably receiving said threaded portion, and means for allowing reciprocation but preventing turning of said roller-carrying head, whereby the length of said valve may be adjusted by turning said notched portion.

References Cited in the file of this patent
UNITED STATES PATENTS

| | | |
|---|---|---|
| 1,656,486 | Huntington et al. | Jan. 17, 1928 |
| 2,321,000 | Bennett | June 8, 1943 |
| 2,336,653 | Taylor | Dec. 14, 1943 |
| 2,596,944 | Shellenberger et al. | May 13, 1952 |
| 2,689,000 | Musat | Sept. 14, 1954 |
| 2,748,844 | Gilchrist | June 5, 1956 |

FOREIGN PATENTS

| | | |
|---|---|---|
| 587,923 | Great Britain | May 8, 1947 |